United States Patent
Lagnier et al.

(10) Patent No.: US 6,408,910 B1
(45) Date of Patent: Jun. 25, 2002

(54) TREAD INCLUDING RECESSED CHANNEL AND RECESSED INCISION AND MOLD FOR TREAD

(75) Inventors: Alain Lagnier, Romagnat; Jean-Luc Chanet, Le Cendre; Georges La Vialle, Billom, all of (FR)

(73) Assignee: Compagnie Generale des Establishments Michelin-Michelin Cie, Clermont-Ferrand (FR)

( * ) Notice: Subject to any disclaimer, the term of this patent is extended or adjusted under 35 U.S.C. 154(b) by 0 days.

(21) Appl. No.: 09/450,255

(22) Filed: Nov. 29, 1999

Related U.S. Application Data (63) Continuation of application No. PCT/EP98/02960, filed on May 20, 1998.

(30) Foreign Application Priority Data

May 30, 1997 (FR) ............................................. 97 06766

(51) Int. Cl.⁷ .......................... B29C 33/42; B29C 33/44; B60C 11/11; B60C 11/117
(52) U.S. Cl. ............................. 152/209.17; 152/209.18; 152/902; 152/DIG. 3; 425/28.1; 425/35; 425/37; 425/38; 425/46
(58) Field of Search .......................... 52/209.17, 209.18, 52/902, DIG. 3, 326; 157/13; 425/28.1, 35, 37, 38, 46, 47

(56) References Cited

U.S. PATENT DOCUMENTS

| | | | |
|---|---|---|---|
| 1,386,513 A | * 8/1921 | Lambert | 425/37 |
| 1,509,259 A | * 9/1924 | Rett et al. | 425/37 |
| 1,604,450 A | * 10/1926 | Krusemark | 425/37 |
| 1,733,064 A | 10/1929 | Lambert | |
| 1,877,988 A | * 9/1932 | Schrank | 152/209.17 |
| 2,382,068 A | * 8/1945 | Kovacs | 152/DIG. 3 |
| 3,432,888 A | * 3/1969 | Brierley | 425/28.1 |
| 4,794,965 A | * 1/1989 | Lagnier | 152/DIG. 3 |
| 4,979,549 A | * 12/1990 | Kaneko | 152/209.17 |
| 4,994,126 A | 2/1991 | Lagnier | 152/209 |
| 5,234,326 A | * 8/1993 | Galli et al. | 425/46 |
| 5,385,189 A | 1/1995 | Aoki et al. | 152/209 |

FOREIGN PATENT DOCUMENTS

| | | | |
|---|---|---|---|
| DE | 2024279 | 3/1971 | |
| GB | 24552 | * 5/1913 | 152/209.1 |
| GB | 242870 | 11/1925 | |
| GB | 474588 | 11/1937 | |
| JP | 61-160303 | * 7/1986 | 152/209.28 |
| JP | 3-153406 | * 7/1991 | |
| JP | 4-310407 | * 11/1992 | 152/DIG. 3 |
| JP | 5-169913 | * 7/1993 | 152/209.17 |
| JP | 7-215015 | * 8/1995 | |

OTHER PUBLICATIONS

JP 02246810, Oct. 1990, Patent Abstracts of Japan, vol. 014, No. 572, 1 page.
JP 03153406, Jul. 1991, Patent Abstacts of Japan, vol. 015, No. 381, 1 page.
JP 07215015, Aug. 1995, Patent Abstracts of Japan, vol. 095, No. 011, 1 page,

* cited by examiner

*Primary Examiner*—Steven D. Maki
(74) *Attorney, Agent, or Firm*—Baker Botts LLP (57) ABSTRACT

A tread for a tire having, on at least one lateral part, and radially to the inside of the running surface of said tread, a plurality of cavities oriented virtually transversely and opening onto at least one of the edges of the tread, the cavities being intended to form grooves and incisions opening radially towards the outside of the tread after wear of between 15% and 45% of the thickness of the tread when new. Also, a mold adapted for the molding of such a tread pattern and including, on at least one part molding one of the sidewalls, elements in relief for molding cavities radially beneath the running surface of a tread when new.

13 Claims, 6 Drawing Sheets

TREAD INCLUDING RECESSED CHANNEL AND RECESSED INCISION AND MOLD FOR TREAD

This is a continuation of PCT/EP98/02960, filed May 20, 1998.

BACKGROUND OF THE INVENTION

The invention relates to a tread pattern for a tread of a tire, and more particularly to a tread pattern which evolves as the tread becomes worn; the invention also relates to a mold for molding such an evolving tread pattern.

A tread of a tire is generally formed by at least one elastomer and is provided with a tread pattern formed of elements in relief (such as ribs or blocks) separated from each other in the circumferential direction and/or in the transverse direction by grooves having cross-sections which have widths typically greater than 2 mm and depths at most equal to the thickness of the tread.

A tire traveling over long distances results in gradual wear of the tread of said tire up to a maximum level of wear which determines what is called the wear life of the tire, which requires either the replacement of the tire or the renovation of the tread thereof by recapping and putting on a new tread.

The elements in relief of a tread play a fundamental role as far as the adhesion of the tire is concerned, both in the transverse direction and in the circumferential direction, and very particularly when traveling on wet and/or snowy ground. In fact, the ridges of the elements in relief, by cutting the film of water present on the surface of the road, make it possible to keep the tread in contact with the road; secondly, the grooves act as preferred passages for evacuating the water in this case.

Obtaining a good level of performance of a tread pattern of a tire also lies in the conformity between said tread pattern of the new tire and the rigidity of the tread. "Rigidity" is understood, among other things, to mean the rigidity of said tread when it is subjected both to loading forces (compressive forces) in the region affected by the contact with the road, for example, and to forces tangential to said region (these latter forces are comparable with shearing forces).

For a given nature of the rubber mix forming the tread, this loading resistance under compressive and shearing stresses depends on the dimensions of the contact surfaces of the elements in relief in contact with the ground and on the height of said elements, that is to say the depth of the grooves defining said elements. The different performances in terms of wear, behavior on dry or wet ground, or of adhesion of a tread of a tire are highly dependent on the rigidity of this tread in the zone affected by the loading.

Furthermore, and in order to increase the number of rubber ridges in contact with the road, a greater or lesser number of incisions or slits is frequently produced in the elements in relief, the width of which incisions or slits is very much less than the width of the grooves defining the elements in relief. The width of an incision, which is variable according to the dimension of the tire in question, is generally less than 2 mm. As a general rule, the incisions have the same depth as the grooves, but they may also affect only the surface part of the tread so as not to reduce too far the initial rigidity of said tread and thus to achieve an acceptable compromise.

The presence of a greater or lesser number of incisions modifies in proportion the rigidity of the elements in relief provided with such incisions, and consequently the rigidity of the tread is affected to a greater or lesser extent thereby.

The assembly formed by these circumferential and/or transverse grooves associated with the incisions produced in the elements in relief of the pattern of a tread imparts to the new tire provided with said tread a level of performance which is entirely satisfactory to the user, whatever the type of roads and/or the climatic conditions encountered.

Nevertheless, the reduction in the thickness of the tread resulting from the progressive wear of the tire results in a reduction in the depth of the grooves and hence in a reduction in the height of the elements in relief. Furthermore, this reduction in the height of the elements in relief results in an increase in the rigidity of each element, and consequently of said tread. Associated with this wear, there is generally noted a loss of effectiveness of the tread pattern after a greater or lesser fraction of the life of the tire. To take account of this, provision may be made to achieve a compromise on the tire when new by providing it with a tread pattern, the optimum point of operation of which is only achieved after a level of wear of its tread.

Another means making it possible to achieve satisfactory operation on the new tire and after a given amount of wear of the tread consists, as described in European Patent 0,378,090, in providing the tread of a new tire with a plurality of incisions having in cross-section a trace, formed of a first rectilinear part extending radially to the inside of the tire over a depth of between 35% and 55% of the total depth of the trace, this first part being divided into at least two branches extending radially to the inside of the tire over the remaining depth such that the number of incisions is multiplied by a coefficient of at least 1,5 starting from the inner end of the first rectilinear part of the trace.

Although this solution achieves good results, it is however not totally satisfactory, because, since the wear of the tread involves a reduction in the volume determined by the grooves and possibly the incisions if present, there results a reduction in the ability of the grooves to evacuate the water present on the road in the case of traveling on a wet road. To overcome this disadvantage, it is known, for example in the field of heavy-vehicle tires, to regenerate the tread pattern after partial wear of the tread by removing material to form new grooves according to a pre-established trace.

SUMMARY OF THE INVENTION

The problem on which the invention is based is to produce a tread of a tire which is optimized from the point of view of the adhesion and behavior performance (that is to say, ensuring perfect control of the road-holding of a vehicle equipped with tires provided with said tread pattern), whether in the initial state or during the life of the tire without this adversely affecting the performance of said tire in terms of its wear life.

Another object of the invention is to provide a tread pattern imparting to a tread a rigidity in the region affected by the contact which is adapted according to the successive states of wear of said tread.

According to the invention, there is proposed a tread of thickness E for a tire, said tread having a running surface, limited transversely by lateral edges, said tread being provided when new with a tread pattern comprising at least a plurality of rubber blocks arranged circumferentially on at least one of its lateral edges, said rubber blocks being separated from each other by grooves oriented virtually transversely and separated from the tread pattern motifs located axially to the inside by grooves oriented mainly circumferentially, the tread being characterized in that it comprises on at least one of its edges comprising a plurality of rubber blocks when new and radially to the inside of each of said blocks:

> at least one channel of average width at least equal to the width of the transverse grooves, each channel having an average trace identical to the average trace of said transverse grooves and being intended to form a groove opening radially towards the outside of the tread after wear of the tread of between 15% and 45% of the thickness E of said tread, each channel extending within the remaining thickness of the tread, and
>
> at least one incision, of low width compared with the average width of each channel, having, in a radial projection on the running surface of the tread when new, an average transverse orientation identical or virtually identical to that of the channel(s) projected on the same surface, each incision opening radially to the running surface at the latest at the time of the appearance of a channel on said running surface and extending, in the thickness of the tread, over the entire depth of the adjacent channel(s) on the same level in the thickness of the tread.

It is judicious for the channels intended to form new grooves to extend in depth at least as far as the maximum level of wear of the tread, so as to maintain good drainage during the entire time of use of the tire provided with a tread according to the invention.

Another object of the invention is to propose a mold for manufacturing a tire for molding such a tread, said mold firstly permitting the molding of a plurality of motifs located radially beneath the running surface of said tread and extending in a substantially transverse direction, and secondly the demolding of the tire using the forces exerted by the material constituting the tread on said mold, so as to reduce the overall molding force and to facilitate the latter.

Usually, a tire mold comprises several parts which, once assembled, define a molding surface corresponding to the outer surface of the tire to be molded. One type of known mold comprises a part forming a ring, intended to mold the tread of a tire, and two parts forming shells intended to mold the sidewalls of said tire. The ring molding the tread is composed of a plurality of sectors, each sector, being able to be displaced in a substantially radial direction of molding/demolding, is provided with a mold fitting composed of a plurality of elements in relief for molding motifs in said tread. Using this known technique, the elements in relief have to have geometries which permit demolding after vulcanization of the tire, that is to say the extraction of said elements from the tread. Consequently, elements in relief having undercut parts are difficult to demold using this technique. Likewise, this technique does not make it possible to mold elements which do not open on to the surface of the tread when new.

For molding channels beneath the running surface of the tread of a new tire, it is known, in particular in U.S. Pat. No. 1,733,064, to produce a plurality of holes in a shell of a tire mold so as to permit the introduction of needles into the rubber forming the tread of a tire once the latter has been molded. Furthermore, means external to said mold are provided for forcing said needles to penetrate the rubber, these same means then serving to cause the needles to emerge again before proceeding to demould the tire by opening the different parts constituting the mold. This mold is particularly complex to produce, and requires at least one shell to be pierced; in the case of a modification, for example of the number of needles, it is necessary to renovate another shell, which is expensive. Furthermore, the presence of holes on the shell involves greater or lesser penetration of the rubber thereinto, which results, after molding, in the presence of molding defects on the sidewalls of the tire.

To solve the problems mentioned above, there is proposed a mold for molding a tire provided with a tread extending axially via the sidewalls as far as the bead zones, said mold comprising two shells provided with molding surfaces each for molding a tire sidewall and a structure forming a ring concentric to the two shells for molding the tread of the tire. The ring and the shells forming the mold according to the invention, in the closed position of the mold, are in contact via their lateral ends so as to define the total molding surface of a tire.

The mold according to the invention is characterized in that:

> at least one shell is formed of at least two annular shell parts concentric to each other, such that the molding surfaces of said parts, in the molding configuration, are in the extension one of the other for molding an entire sidewall,
>
> at least one of the shell parts is provided with at least a plurality of elements in relief projecting onto the molding surface of said shell part, said elements in relief of the same shell part having virtually the same geometry and the same orientation defined as being the direction between the point of anchoring of an element on the shell part and the end of said axially outermost element of said shell part,
>
> each of the shell parts bearing elements in relief is mounted to be mobile in the circumferential direction relative to the other parts of the same shell, so as to permit the rotation of each of said parts relative to the other parts of the same shell at least under the action of the forces exerted by the rubber mixes on the elements in relief during demoulding, with the aim of facilitating the demoulding of the tire.

In this manner, it is possible to reduce the forces necessary for demolding the elements in relief borne by each shell part, since under the action of the reaction forces produced by the vulcanized rubber mixes during the demolding on said elements, each part will rotate relative to the other parts of the same shell.

A mold according to the invention makes it possible, in simple manner, to effect molding and demolding of tires comprising tread pattern motifs opening on to at least one edge of the tread, said motifs having an orientation which is overall different from the transverse direction of the tire. The mold according to the invention also makes it possible to mold tread pattern motifs with elements in relief having highly non-demoldable geometries (that is to say, geometries such that the molding in a non-elastically deformable material cannot be followed by demolding without degrading either the elements in relief or the molded material).

A mold according to the invention may comprise at least one shell formed by the assembly of several annular parts concentric to one another, of which at least two of said parts are circumferentially mobile relative to a fixed part of said shell to permit, for example, the production of several levels of tread pattern in a tread (an arrangement which is particularly advantageous in the case of tires for heavy vehicles having treads of a thickness which is relatively greater than that of passenger car tires). Advantageously, the shell parts bearing elements in relief are mobile independently of each other.

DESCRIPTION OF THE DRAWINGS

The invention which has been set forth above will be better understood with reference to the following drawings, which relate to several tread pattern variants and to a mold for molding said tread patterns; the examples of tread patterns shown here are shown solely by way of illustration, and cannot be considered to be limitative:

FIG. 3-A shows the view along the section A—A of the tread, the running surface of which when new is shown in FIG. 1;

FIG. 3-B shows the view along the section B—B of the tread, the running surface of which after wear is shown in FIG. 2;

DESCRIPTION OF PREFERRED EMBODIMENTS

Figure 1:
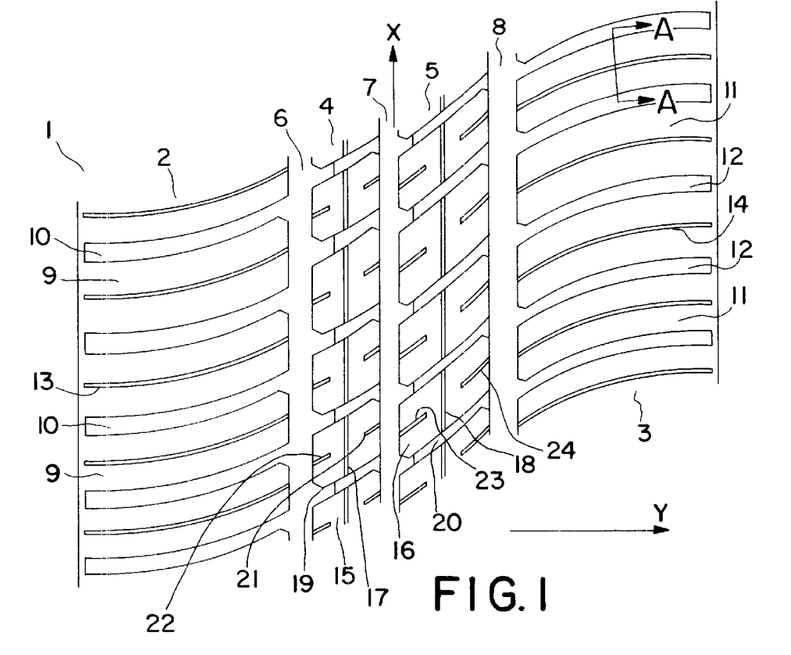
FIG. 1 shows, when new, a plan view of the running surface of a tread pattern according to the invention.

In FIG. 1 there is shown part of an evolving tread pattern of a tread of thickness E intended to be arranged radially to the outside of the reinforcement armature of the crown of a tire. In the case in question, the thickness E of said tread is equal to the radial distance between the running surface when new and the radially outermost surface of the reinforcement armature of the crown of the tire.

"Evolving tread pattern" is understood to mean a tread pattern, the running surface of which, which is intended to be in contact with the road, evolves with the wear of said tread resulting from the travel of the tire, the evolution being predetermined at the time of designing said tire, so as to obtain adhesion and road handling performances which remain substantially unchanged during the entire period of use of the tire, whatever the degree of wear of the tread.

The tread pattern when new, the running surface 1 of which has been shown in FIG. 1, is composed of two rows of edge blocks 2, 3 surrounding two rows of intermediate blocks 4, 5, said rows being arranged in the circumferential direction of the tire (in the direction of the arrow X) and being separated from each other by circumferential grooves of rectilinear trace 6, 7, 8. The intermediate groove 7 is slightly offset in the transverse direction (marked by the arrow Y, which is the same as the axis of rotation of the tire) so as to divide the tread into two parts of unequal widths, the rubber blocks of the intermediate row 5 having a dimension in the transverse direction which is substantially larger than that of the blocks of the intermediate row 4.

The blocks of rubber mix 9, 11 of the rows 2, 3 located on the edges of the tread are spaced apart in the circumferential direction by grooves 10, 12 of curved average trace and of oblique orientation, that is to say, forming an average angle close to 15° with the transverse direction (shown by the arrow Y). These grooves 10, 12 have average traces, the curvatures of which are of opposite sign, and said grooves have average widths on the running surface of the new tire of between 4 and 6 mm.

"Average trace of a groove or incision opening onto a running surface" is understood to mean the profile, constructed on said surface, equidistant from the traces of the edges of the groove or of the incision on the same surface. "Orientation of a groove or an incision on the same surface" is understood to mean the direction formed by the intersection with said surface of a plane passing through the points axially farthest from the average trace of said groove or incision on the same surface.

Furthermore, each of the blocks 9, 11 located on the edges of the tread of the tire is provided with an incision 13, 14 of a width of 2 mm, the average trace of which on the running surface of the new tire is substantially parallel to the average trace of the grooves defining said blocks, each of said incisions dividing the contact surface of each block, when new, into two parts of virtually equal area.

The blocks 15, 16 forming the two intermediate rows 4, 5 located between the rows of the edges of the tread are spaced apart circumferentially by grooves 19, 20 of oblique orientation and are provided with a circumferential incision 17, 18 opening on to the entire contact surface of said blocks and dividing said blocks into two parts of substantially equal area. Each of said incisions 17, 18 is extended radially to the inside of the tread by a channel of width 3 mm so as to cause a circumferential groove 171, 181 to appear after partial wear (as shown in FIG. 2).

Furthermore, on each of the blocks 15, 16 and on either side of the circumferential incisions 17, 18, two incisions 21, 22 and 23, 24 of oblique orientation are provided which open only on one side of said blocks into a circumferential groove (these two incisions of oblique orientation have average traces, on the running surface 1, substantially parallel to the average traces of the grooves 19 and 20 circumferentially separating the blocks 15, 16). On some of the blocks 15 and 16, these incisions 21, 22 and 23, 24 have the special feature of having, when viewed in cross-section, Y-shapes with two branches so as to form, after partial wear of the tread, two new incisions 211, 221 and 231, 241, as shown in FIG. 2.

Figure 2:
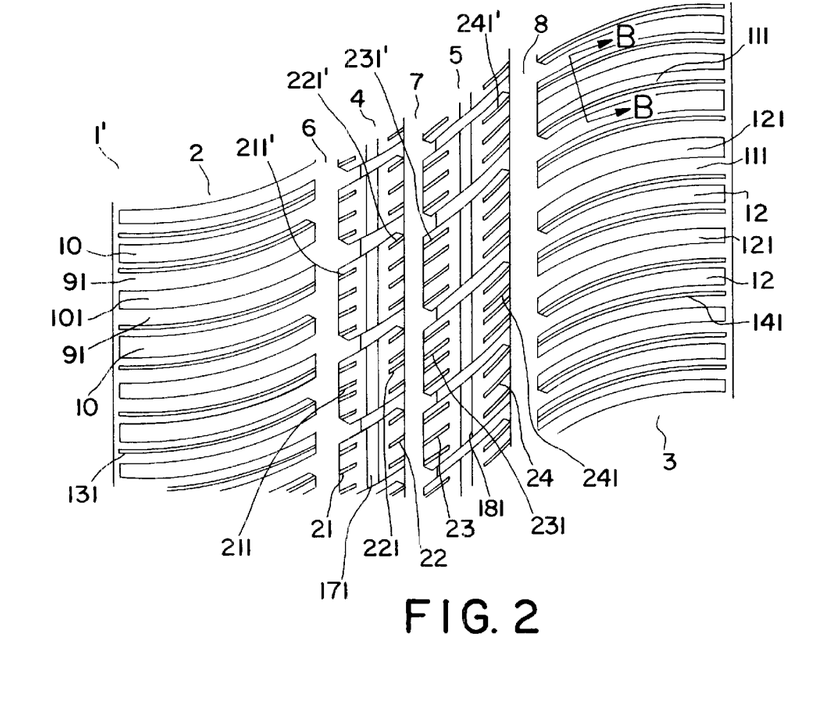
FIG. 2 shows the new running surface of the tread pattern of FIG. 1 after partial wear of the tread.

FIG. 2 shows the new running surface 1' of the same tread after wear affecting the entire axial width of said tread and slightly greater than 20% of the thickness E of said tread.

This tread has a running surface 1' corresponding to a new tread pattern comprising on each edge row 2, 3 a number of blocks 91, 111 which has doubled compared with the number of blocks apparent on the running surface of the new tire. These new blocks are separated circumferentially from each other by the initial grooves 10, 12 and by new grooves 101, 121 which have appeared on the new running surface of the tire, said new grooves having average traces identical to those of the initial grooves 10, 12 and an average width substantially equal to the width of the grooves 10, 12 opening on to the running surface when new. Furthermore, each newly formed block is provided with an incision 131, 141, the average trace of which is identical to that of the new grooves 101, 121. The presence of these incisions combined with the new grooves formed makes it possible to obtain suitable flexibility of the rubber blocks after partial wear.

Furthermore, there are provided, on all the blocks of the intermediate rows 4, 5 and in the vicinity of the leading and trailing edges of said blocks, two additional incisions 211', 221' and 231', 241', opening radially onto the running surface after partial wear of the tread, each of said incisions communicating with a circumferential groove transversely defining each of said blocks.

Figure 3A:
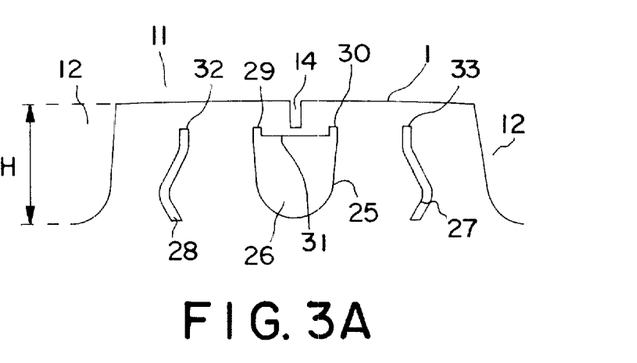

The sectional view of FIG. 3-A shows in part the thickness of the tread along the cut A—A made on a rubber block 11 of the row 3 of the edge of said new tread shown in FIG. 1.

On this cut, effected in a plane perpendicular to the axial direction Y, there can be seen a block 11 defined, when new, by two grooves 12 of depth H (H being less than the thickness E of the tread) oriented substantially transversely and provided with an incision 14 opening on to the running surface 1 of the new tire, said incision 14 extending radially over a depth of about 15% of the thickness E of the tread when new. Beneath the running surface 1 of the new tread, three cavities forming channels have been molded: the first cavity 26, which is in the form of a closed U, with on either side of this first cavity two cavities 27, 28 each forming an incision of small width compared with the average width of the cavity 26 and the trace of which follows a broken line in the direction of the thickness of the tread. The incision 14 opening onto the running surface of the new tire is not, in the case in question, connected to the cavity of U-shaped cross-section, but it might be (see the example of FIG. 4).

The central cavity 26 and the two cavities 27, 28 located radially beneath the running surface 1 of the new tread are intended, after partial wear of said tread of between 15% and 45% of the thickness E, to form a new tread pattern, the characteristics of which are adapted to the reduced thickness of the tread.

Advantageously, the contour 25 of the cross-section of the cavity 26 comprises, in the vicinity of the running surface 1 of the new tire, at least two small contour sections 29, 30 spaced apart by a contour section 31 which is radially slightly farther from the running surface 1 of the new tire than said small contour sections, such that, after partial wear of the tread, the small contour sections 29, 30 open radially onto the new running surface, and that thus more rapid complete opening of the total width of the groove 26 is obtained over said new running surface. Preferably, the contour sections 29, 30 are separated by a distance at least equal to half the maximum width of the channel 26.

The cavities 27, 28 on either side of the central cavity 26 are formed within the thickness E of the tread so that the points of their respective contours 32, 33 which are closest to the running surface 1 of the new tire are at most located at a depth equal to the depth of the points of the channel 26 which are closest to said running surface, to open onto the running surface obtained after partial wear and to be active at the latest when the new groove is formed on said new surface. As can be seen in FIG. 3-A, the cavities 27 and 28 extend radially up to the point of greatest depth of the central cavity 26, so as to be active up to the level of maximum wear of the tread.

Figure 3B:
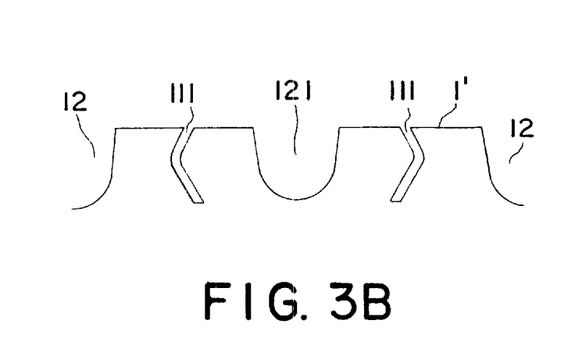

After wear, and as shown in FIG. 3-B, the central cavity 26 and the cavities 27, 28 open radially onto the new running surface 1' to form a new groove 121 and two new incisions 111 transversely connecting the outside of the tread to the circumferential groove 8 defining the blocks 3 of the edge of said tread.

Thus, the combination of a new groove and two incisions radially to the inside of each rubber block of the edges of the tread makes it possible to produce a tread pattern which retains, with wear, both good drainage ability (linked to the volume represented by all the transverse grooves), good adhesion performance (increase in the number of rubber ridges with wear) and road handling (regular adaptation of the rigidity of the tread both by the modification of shape of the blocks and by the number of incisions).

A tire of dimension 175/70 R 13 was produced with a tread provided with an evolving tread pattern corresponding to the tread pattern represented by FIGS. 1 and 2. When new, the tread has a thickness of 8.5 mm and a width of 125 mm; the surface groove ratio when new is of the order of 27% (the surface groove ratio is defined as the number obtained by calculating the ratio between the difference between the total area of the contact imprint and the area of contact of the elements of the tread pattern with the road and the total area of the contact imprint). The grooves opening onto the running surface when new have average widths of between 4 and 6 mm.

The tire provided with a tread having the evolving tread pattern described is well suited to the needs of users, whatever the level of wear of said tire, since after wear of about 2.5 mm of the tread, the cavities radially beneath the running surface when new open on to the new running surface to ensure that the volume groove ratio is kept virtually constant and equal to the volume groove ratio when new. "Volume groove ratio" is understood to be a measurement of the ability of the tread pattern to evacuate a total volume of liquid.

Figure 4:
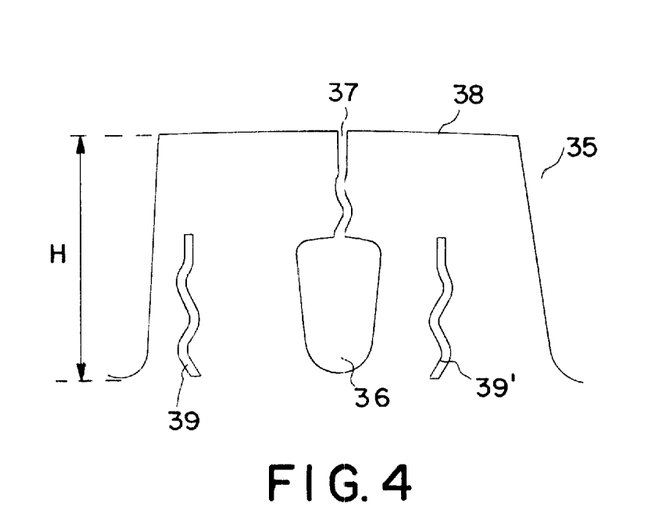
FIG. 4 shows a sectional view of a rubber block of a tread provided with a tread pattern according to the invention.

FIG. 4 shows a variant of the tread pattern previously described when new, in which a block 35, viewed in section, is defined by grooves of depth H (H<E) and is provided with a channel 36 located radially to the inside and in a central position relative to said block. This channel 36 is substantially O-shaped, and communicates with an incision 37, the trace of which, in the thickness of the tread, follows a succession of broken lines, said incision 37 opening on to the running surface when new. Two incisions 39, 39' of a trace undulating according to the thickness are made on either side of the channel 36, and are intended to be active on the running surface once the channel 36 has opened on to the running surface after partial wear of the tread, and at least until maximum intended wear of the tread has occurred.

Other variants of evolving tread patterns according to the invention are shown in FIGS. 5 to 9, in which there are shown sections, made in planes perpendicular to the axis of rotation of the tire, of rubber blocks comprising channels and incisions radially beneath the running surface when new.

"Cross-section" is understood to mean a section in a plane perpendicular to the axis of rotation of said tire.

Figure 5:
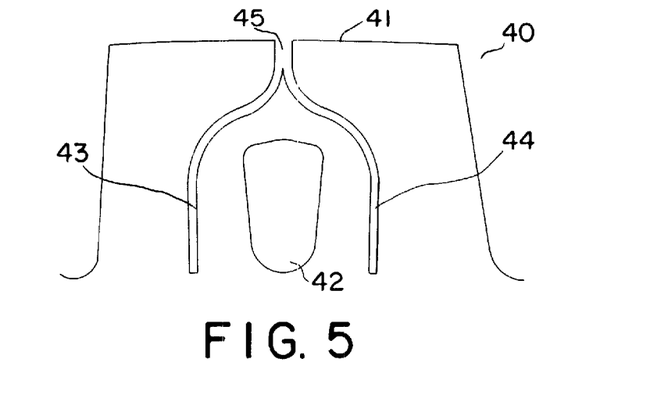
FIGS. 5 to 9 show, viewed in section, five possible variants of a rubber block of a tread provided with a tread pattern according to the invention.

FIG. 5 shows a section of a rubber block 40 comprising radially beneath the running surface 41 when new a channel 42, the cross-section of which is in the shape of an O surrounded by the two branches 43, 44 of an incision 45 having the general shape of a Y, said incision opening onto the running surface 41 of the tread when new.

Figure 6:
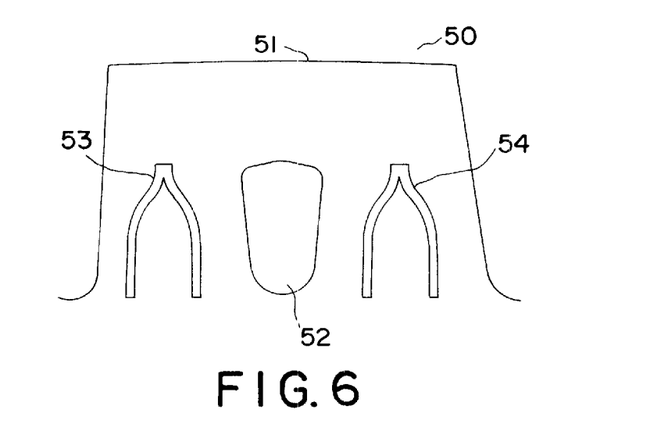

FIG. 6 shows a section of a rubber block 50 comprising radially beneath the running surface 51 when new a channel 52, the cross-section of which is in the shape of an O surrounded by two incisions 53, 54 each having the general shape of a Y, said incisions opening on to the running surface only after partial wear of the block 50 has occurred (and as is the case for the channel 52).

Figure 7:
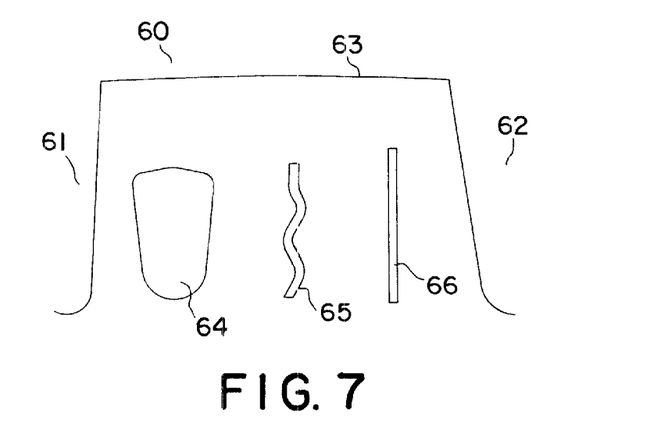

FIG. 7 shows a section of a rubber block 60 defined circumferentially by two grooves 61, 62 and comprising radially beneath the running surface 63 when new a channel 64, the cross-section of which is substantially in the shape of an O. This channel is preferably placed in the block 60 in a position offset relative to the median plane of said block, so as to create, after partial wear of said block, two new blocks, the widths of which, measured in the circumferential direction, are different. On the narrow, non-rigid part, between the groove 61 and the channel 64, there is not provided any additional incision, whereas on the wide part, between the channel 64 and the groove 62, there are provided two incisions 65, 66, one of which is rectilinear and the other of which has in the radial direction a trace formed of a succession of undulations, to create, after partial wear, two new incisions enabling the rigidity of said wide part to be adjusted.

Advantageously, at least two different, successive evolutions of the pattern of a tread may be provided, each corresponding respectively to a predetermined level of wear. Thus the operation of the tread is adapted as well as possible during the entire useful life of the tire, in particular for thick treads (as is the case for tires intended for heavy vehicles).

Figure 8:
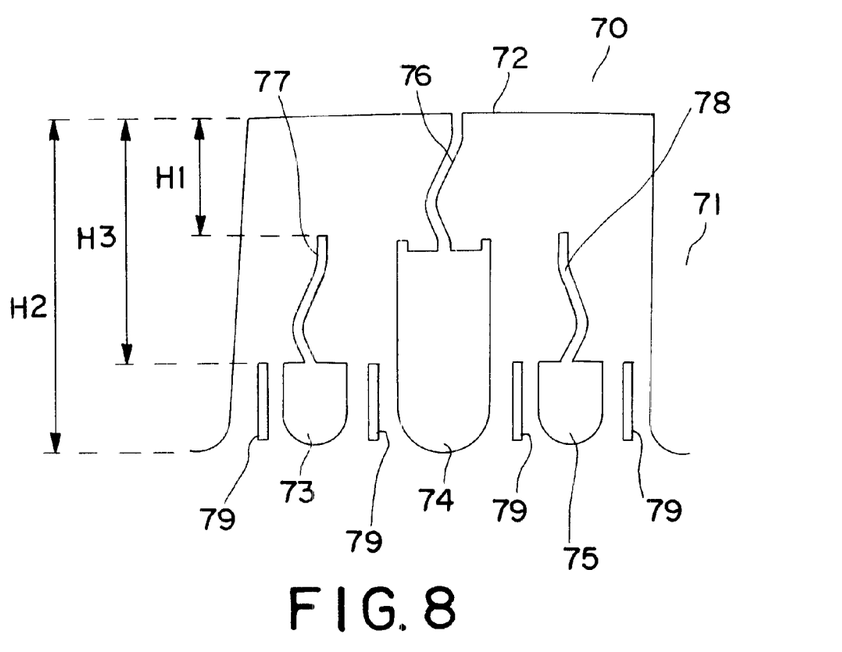

An example of such a tread pattern is shown in FIG. 8, which shows a section through a rubber block 70 comprising three channels radially beneath the running surface 72 when new. One channel 74, the cross-section of which, which is of substantially constant length, has an elongate shape, occupies the median position in the block 70 and has a contour which extends radially between a depth H1 and a depth H2; the median channel 74 is extended radially to just below the running surface 72 when new by an incision 76 following a zigzag trace. On either side of the median channel 74 there are provided two lateral channels 73, 75 having contours of the same width and extending between a depth H3 (strictly greater than H1) and the depth H2 (by convention, all the depths are measured radially relative to the running surface 72 when new, that is to say, perpendicular to said surface). These lateral channels 73, 75 are extended radially as far as the depth H1 by incisions 77, 78, the trace of which in the direction of the thickness of the block 70 is formed of broken lines. Furthermore, there are provided within the rubber parts between the channels 73, 74, 75 a plurality of rectilinear incisions 79 which extend between the depths H3 and H2.

The rubber block 70 of FIG. 8 has the special feature of having two different new tread patterns for two distinct levels (corresponding respectively to the depths H1 and H3, with 0.15×H2<H1<0.45×H2 and H3>H1, H2 corresponding to the depth of the grooves 71 defining the block 70 and H2<E). In fact, between the depths H1 and H3, there is formed on the running surface a groove corresponding to the median channel 74 and dividing the initial block into two blocks, each new block being provided with an incision. Between,H3 and H2, the lateral channels 73, 75 open on to the new running surface to again divide the blocks formed from the depth H1 into two new blocks and to form new grooves, the average traces of which, on the new running surface, are similar to the traces of the grooves 71 on the running surface when new.

Figure 9:
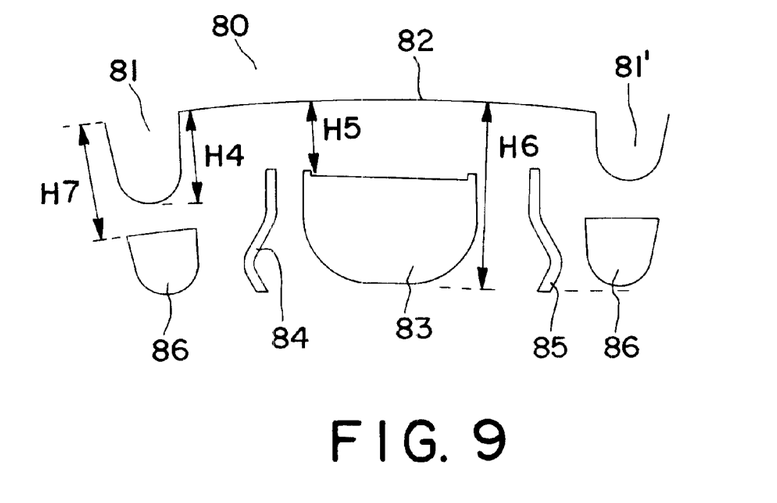

Another way of obtaining a tread having several new different tread patterns for distinct levels of wear is shown in FIG. 9. In this figure, a block 80 is shown in section and is defined circumferentially by two grooves 81, 81' of the same depth H4 measured relative to the running surface of the new tire. This block comprises, radially beneath its running surface 82 when new, a channel 83, the contour of which extends between a depth H5 and a depth H6 (H6<E), such that: H5<H4<H6 and on either side of said channel two incisions 84, 85 extending substantially between the same depths as said channel 83. Furthermore, there is provided, radially beneath each groove 81, 81' defining the block 80, a channel 86, the contour of which extends between a depth H7 and the depth H6. Thus, after partial wear of the block 80 over a depth H5 (H5<H4), a new groove appears, formed by the channel 83 and dividing said block into two blocks. Then after wear greater than the depth H4, the grooves 81, 81' defining the block when new disappear; finally, when the wear is greater than the depth H7, the channels 86 located radially beneath the grooves 81, 81' appear on the running surface to form two new grooves. This arrangement makes it possible to achieve great rigidity of the tread when new, while maintaining an adequate liquid drainage volume.

Preferably, the channel 83 which is present in the median part of the block 80, when viewed in section, has a width greater by at least 50% than the width of the grooves 81, 81' defining the block when new, so as to maintain an adequate drainage volume, even when the initial grooves have disappeared.

"Drainage volume of a groove" is understood to mean a measurement of the volume taken up by said groove, corresponding approximately to the product of the surface of its cross-section and its length.

The examples of channels and incisions produced beneath the running surface of the blocks which are located on the edge of a tread and which have just been described may also be produced in the case of tread patterns comprising, on the edges and when new, a continuous strip of rubber forming a rib. After partial wear of the tread has taken place, said continuous strip has a succession of rubber blocks separated from each other by grooves, each block furthermore having at least one incision, the average trace of which on the running surface is close to that of said grooves.

Advantageously, it is useful to provide for the orientations of the average traces of the grooves appearing after wear to be opposed (i.e. symmetrical relative to an axis parallel to the transverse direction) to the orientations of the average traces of the grooves opening onto the running surface of the new tire, so as to avoid any initiation of irregular wear and thus to increase the life of the tire.

Figure 10:
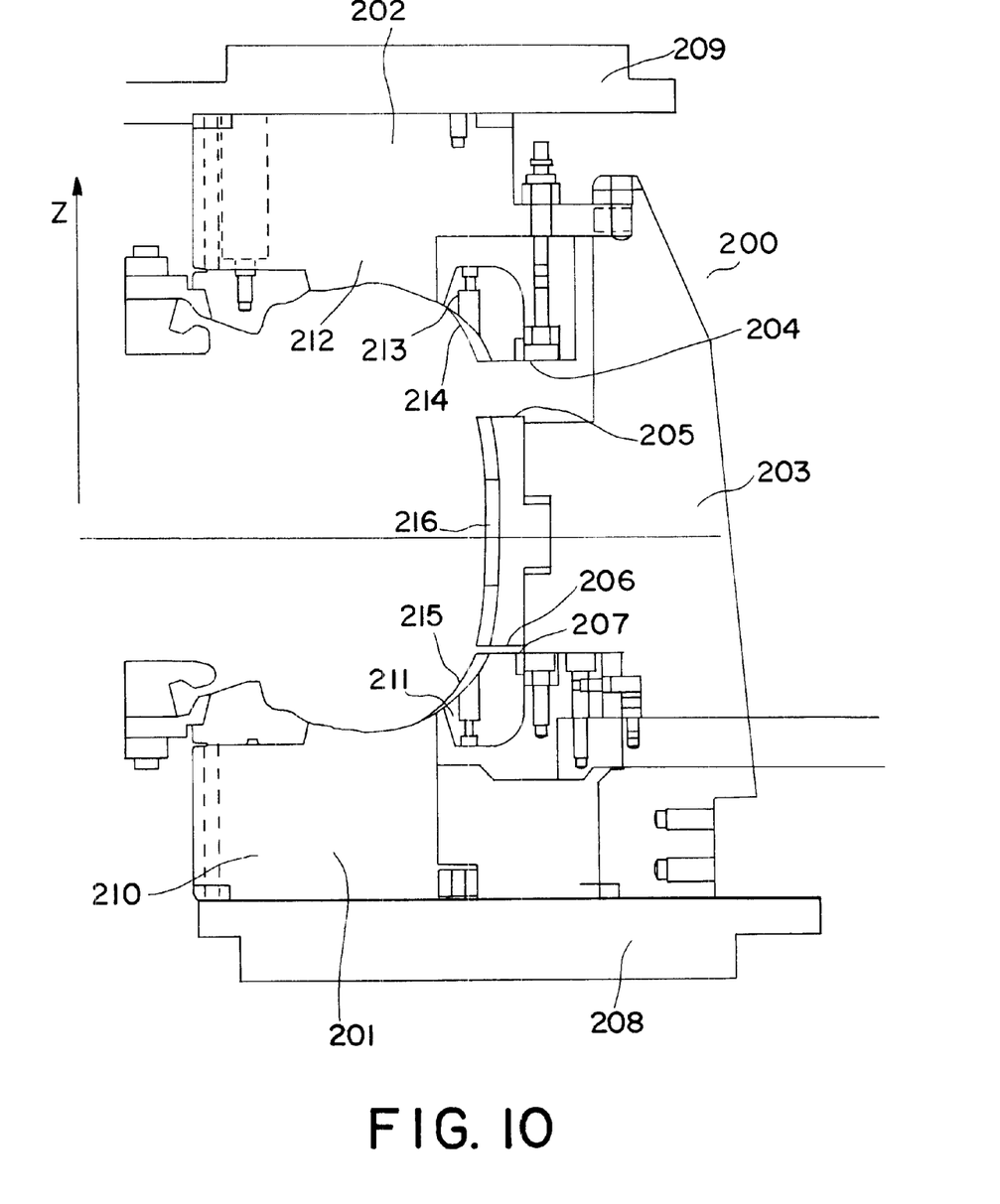
FIG. 10 shows a radial section through a mold for molding a tire, the shells of which are intended to mold the sidewalls of said tire and comprise a circumferentially mobile part.

FIG. 10 shows a section through a mold 200 for molding a tire, said mold being in the open position and placed in the horizontal position such that the axis of rotation of the tire is vertical (parallel to the direction indicated by the arrow Z). The mold 200 comprises a lower shell 201 and an upper shell 202 for molding the sidewalls of said tire and, interposed between said two shells, an intermediate element forming a ring 203 for molding the tread pattern motifs of the tread of said tire. In the molding position, and in known manner, the various elements constituting the mold are in contact by means of their lateral ends 204, 205 and 206, 207, so as to obtain a molding volume limited by a molding surface formed by the joining of the molding surfaces of the shells and of the crown ring.

By definition, a shell corresponds to a part molding the outer surface of the tire extending the running surface of the tread and extending as far as the region of the bead of said tire.

The lower shell 201 is kept integral with a fixed base 208 by appropriate fixing means (not described here), whereas the upper shell 202 is integral with a plate 209 which is mobile in a direction (indicated by the arrow Z) perpendicular to the median plane of the mold coinciding with the equatorial plane of the tire blank in place in said mold.

The ring 203 molding the tread of the tire comprises a plurality of sectors in contact two by two in the circumferential direction, each of said sectors comprising a support and a molding fitting 216 for molding the tread pattern motifs opening on to the running surface of the new tire, said fitting being fastened radially to the inside of the support by suitable fastening means. Furthermore, means are provided for radially displacing the sectors so as to form the molding ring of the tread, the same means serving to displace the same sectors in the opposite direction so as to open the mold to remove the tire therefrom after molding.

The shells 201, 202 are formed by the assembly of a first and a second annular concentric part, 210, 211 and 212, 213, respectively. Each first shell part 211, 213 is arranged so as to be located between a second shell part 210 or 212 respectively, and the crown ring 203 in the molding position. The two parts constituting the same mold are arranged such that their molding surfaces are in the extension of one another.

The second part 212 of the upper shell 202 is assembled integrally with the plate 209 which is mobile in the direction indicated by the arrow Z, whereas the first part 213 of the same upper shell is assembled with the second part 212 using connection means permitting solely rotation of said first part relative to the second part under the action of circumferentially oriented forces and being exerted on the first shell part (the axis of rotation of said part is parallel to the direction Z).

The lower shell 201 is fastened to the base 208 by the second shell part 210, whereas the first part 211 is linked to the second part 210 by fastening means which permit rotation of said first part relative to said second part under the action of forces directed circumferentially and being exerted on said first shell part.

So as to mold the tread pattern motifs beneath the running surface of a tread of a tire, the shell parts 211, 213 which are mobile circumferentially are provided with a plurality of elements in relief 214, 215 projecting on the molding surface of said parts to radially mold, beneath and within said tread, a plurality of motifs, the demoulding of which is then effected laterally and not radially as is the case for the motifs molded by the elements in relief borne by the fittings 216 of the sectors forming the crown ring 203.

"Laterally" is understood to mean that the elements in relief projecting on the molding surface of the upper shell are demolded, that is to say, extracted from the tread, by displacing the upper plate 209 in a direction parallel to the arrow Z (parallel to the axis of rotation of the tire) so as to entrain therewith the upper shell 202 and with it said elements in relief 214.

Figure 11:
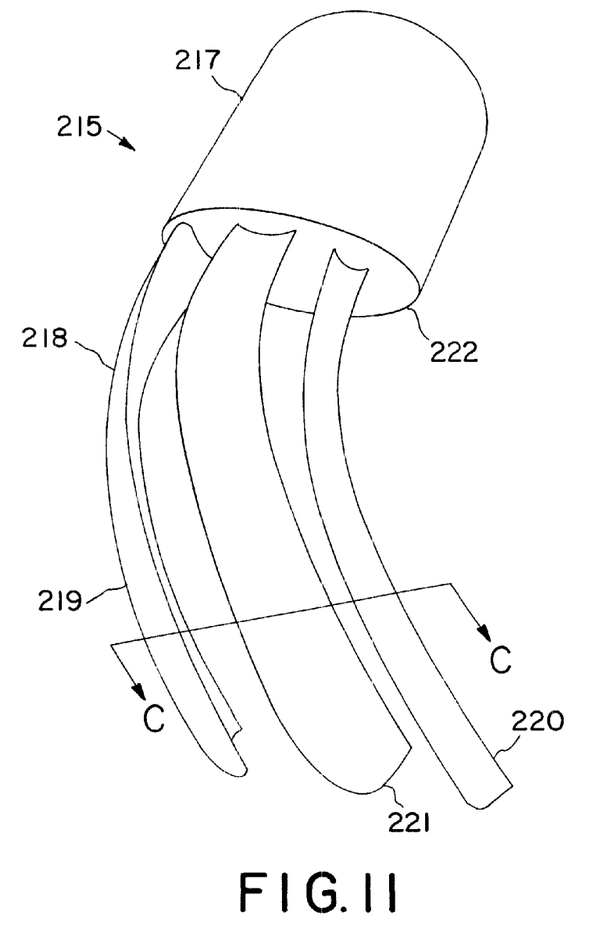
FIG. 11 shows a molding element comprising three fingers and intended to be fitted on the mobile parts of the shells shown in FIG. 10 to mold a channel and two incisions located radially beneath the running surface of a new tire.

An example of embodiment of an element in relief borne by a shell part is shown in FIG. 11. In this figure, there can be seen in perspective an element in relief 215 composed of a support part 217 intended to anchor said element on the corresponding shell part, and of a part 218 in the extension of the support part 217 and projecting on the molding surface of the shell for molding a plurality of motifs in a tread. The part 218 projecting on the molding surface of the shell is formed of three "fingers" 219, 220, 221 substantially of the same length and arranged parallel to each other so as to mold a channel, and on either side two incisions; in the molding position, the motifs molded with the element in relief have radial projections on the running surface of the new tire, the average curved traces of which have orientations forming substantially the same angle, other than 0°, with the transverse direction.

Viewed in a radial direction when they are in the molding position, the three fingers of the same element in relief follow a curved geometry, whilst their cross-section gradually decreases from the support part 217 forming the anchor for the fingers 219, 220, 221 towards the opposite end of said fingers, so as to follow substantially the meridian profile of the crown reinforcement of the tire.

Figure 12:
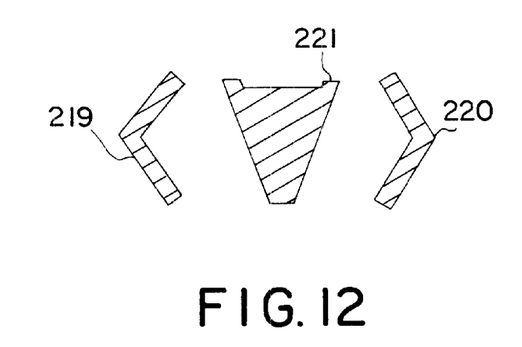
FIG. 12 shows a section along C—C of the molding element of FIG. 11.

The finger 221 in the median position has a V-shaped section of a maximum width of 5 mm for molding a channel, while the other two fingers 219, 220 on either side of the median finger 221 have, in cross-section, a zigzag shape for molding thin incisions of a thickness of 2 mm. (See FIG. 12 showing a section along the line C—C made in FIG. 11).

In order to be able to mold different tread patterns with the same shells, it is judicious to provide connecting means between each of said elements in relief and the shell part which is mobile in rotation, permitting the fastening and easy replacement of at least one of said elements in relief.

Once the non-vulcanized, non-molded tire blank has been introduced into the mold 200, the latter is gradually closed so as to present a molding surface on which project the elements in relief borne by the crown fittings 216 of the ring 203 and those borne by the shells 201, 202. Once the mold has been completely closed, inflation means internal to the blank permit the application of said blank against the molding surfaces while coating the elements in relief to form the motifs constituting the tread pattern of the tire.

After molding and vulcanizing the tire, it is demolded as follows:
 the sectors of the ring 203 are moved apart radially to demold the crown of the tire and to extract the elements in relief of the fittings radially from the tread;
 the upper shell 202 is moved apart axially (in the direction Z) from the lower shell 201 by displacing the upper plate 209 so as to demold the sidewalls of the tire and to extract the elements in relief 214, 215 borne by the shells. In this movement, the elastomeric material forming the sidewalls is deformed elastically under the action of the demolding forces to permit said elements in relief to be released; secondly, taking into account the geometry of the elements in relief 214, 215, the elastomeric material surrounding said elements in relief opposes the demolding of said elements in relief and exerts thereon reactive forces, one component of which is oriented circumferentially. This component of circumferential force is used precisely for turning the shell part 213 bearing the elements in relief 214 relative to the other shell part 212, which is fixed in rotation, of the same shell 202, so as to facilitate the demolding of said elements in relief 214. At the same time, the displacement of the upper plate 209 takes with it the tire, which exerts a demolding force on the lower shell 201 (in the direction Z), which also causes the elements in relief 215 of said lower shell to be demolded by rotating the part 211 relative to the part 210.

To obtain an effective rotational effect of part of a shell relative to the other part of the same shell during demoulding, it is necessary for all the elements in relief borne by said shell to have virtually the same orientation relative to the axial direction such that they all cause a component of circumferential force in the same direction during demoulding; however, the elements in relief borne by the upper and lower shells may have orientations of opposite signs (this is moreover the case for the tread pattern shown in FIGS. 1 and 2).

Advantageously, elastic return means are provided between the different parts of the same mold, ensuring, after demolding, that each mobile shell part returns to the molding position.

To facilitate demolding, the elements in relief may be coated with a thin layer, which can be renewed if necessary, of a material having a low coefficient of adhesion to the elastomeric material forming the tread. A material based on Teflon® and silicone, such as Xylan®, is particularly well suited for this use.

The elements in relief 214, 215 borne by the molds are produced by machining, by casting metal alloy or alternatively by injecting a thermohardenable material.

Advantageously, the fingers forming the elements in relief are made of a material which has a very low remanence to the deformation which occurs during molding under the action of the thrust exerted by the molded elastomeric material, so as to ensure a return to the initial geometry of the molding fingers after each molding.

Advantageously, the elements in relief of the same mold may have sufficient lengths to affect all or virtually all of the width of the molded tread.

So as to obtain a cavity beneath the running surface of a tread having the specific characteristic of being oriented, at least over a major part, in a direction close to or equal to the circumferential direction, it is possible to use a mold according to the invention comprising a shell, a mobile part of which is provided with at least one molding finger extending, over a greater or lesser length, mainly in a direction close to the circumferential direction; according to this same principle, it is possible to conceive of producing a channel which goes right round the tire, or even goes round it several times; in this case, it may be necessary to add to said mold mechanical drive means which make it possible to cause the mobile shell part to rotate in order to facilitate the rotation and the extraction of the finger(s) and thus to permit demoulding.

These same additional drive means may also be used to make the elements in relief penetrate into the rubber at the time of molding.

Another advantageous measure consists in providing housings in the elements in relief borne by the ring to mold grooves in the tread, each housing being intended to receive, when the mold is closed, at least one finger borne by one or the other of the shells, so as to ensure good positioning of said finger during molding, while mechanically stiffening this element to allow it better to withstand the thrust forces exerted by the molded material during the phase of thrusting against the molding surface of the mold, corresponding to the molding.

The arrangements which have been described for a sector mold apply in the same way to other methods of molding, if there are mold parts for molding the sidewalls of the tire. In particular, they apply to the mold for molding a tire described in French Patent Application 2 691 095.

A tire molded in a mold comprising elements in relief on at least one of its shells for molding cavity motifs beneath the running surface when new may have on the outer edges of its tread an imprint of the faces 222 of the parts 217 forming a support for said elements in relief (see FIG. 11); this imprint may be recessed or in relief, or even alternately recessed and in relief.

The mold which has just been described makes it possible to produce, in simple manner and at low cost, tread patterns according to the invention such as, for example, those illustrated in FIGS. 1 to 9.

We claim:

1. A tread of thickness E for a tire, said tread having a running surface, limited transversely by lateral edges, said tread being provided when new with a tread pattern comprising at least a plurality of rubber blocks arranged circumferentially on at least one of its lateral edges, said rubber blocks being separated from each other by grooves oriented virtually transversely and separated from tread pattern motifs located axially to the inside by grooves oriented mainly circumferentially, wherein each of said plurality of blocks comprises:

several successive layers defined radially beneath the running surface when new corresponding to levels of partial wear of the tread, each of said levels being defined by its distance measured relative to the ring surface when new, a first level being located at a distance of between 15% and 45% of the thickness E of said tread and the following levels being located at distances greater than said first level, and for each level of wear:

at least one recessed channel of average width at least equal to the width of the transverse grooves, each recessed channel (1) having an average trace identical to the average trace of said transverse grooves, (2) forming a new groove opening radially towards the outside of the tread after wear of the new tread to the respective level, and (3) extending within the remaining thickness of the tread; and at least one recessed incision, not opening to the running surface of the tread when new and having, in radial projection on the running surface of the tread when new, a transverse orientation identical or virtually identical to that of the recessed channel(s) projected on the same surface and each incision having small width compared with the average width of said channel(s), each incision opening rally onto the running surface at the time of the opening of the recessed channel to form said new groove on said running surface and extending within the thickness of the tread over the entire depth of the opened channel(s).

2. A tread of thickness E for a tire, said tread having a running surface, limited transversely by lateral edges, said tread being provided when new with a tread pattern comprising at least a plurality of rubber blocks arranged circumferentially on at least one of its lateral edges, said rubber blocks being separated from each other by grooves oriented virtually transversely and separated from tread pattern motifs located axially to the inside by groves oriented mainly circumferentially, when each of said plurality of blocks comprises:

at least one recessed channel of average width at least equal to the width of the transverse grooves, each channel (1) being radially beneath the running surface, (2) having an average trace identical to the average trace of said transverse grooves, (3) forming a new groove opening radially towards the outside of the tread to divide said block into two blocks after wear of the new tread of between 15% and 45% of the thickness E of said new tread, and (4) extending within the remaining thickness of the tread; and at least one Y-shaped incision having, in radial projection on the running surface of the tread when new, a transverse orientation identical or virtually identical to that of the channel(s) projected on the same surface and each incision having small width compared with the average width of each channel, said at least one Y-shaped incision comprising a stem and two branches recessed radially towards the inside from the running surface, at least one branch being located on either side of said at least one channel, each Y-shaped incision opening radially onto the running surface at the latest at the time of the opening of the channel to form said new groove on said running surface and extending within the thickness of the tread over the entire depth of the opened channel(s).

3. The tread according to claim 2, wherein the stem of said at least one Y-shaped incision opens through the running surface when the tread is new.

4. The tread according to claim 2, wherein the stem of said at least one Y-shaped incision is recessed radially towards the inside from the running surface when the tread is new.

5. The tread according to claim 2, comprising at least two of said Y-shaped incisions, one of said two Y-shaped incisions being located on either side of said at least one recessed channel.

6. A tread of thickness E for a tire, said tread having a running surface, limited transversely by lateral edges, said tread being provided when new with a tread pattern comprising at least a plurality of rubber blocks arranged circumferentially on at least one of its lateral edges, said rubber blocks being separated from each other by grooves oriented virtually transversely and separated from tread pattern motifs located axially to the inside by grooves oriented mainly circumferentially, wherein radially beneath the running surface each of said plurality of blocks comprises:

at least one recessed channel of average width at least equal to the width of the transverse grooves, each recessed channel (1) having an average trace identical to the average trace of said transverse grooves, (2) forming a new groove opening radially towards the outside of the tread after wear of the new tread of between 15% and 45% of the thickness E of said new tread, (3) extending within the remaining thickness of the tread and (4) having a contour, when viewed in section, which has at least two contour parts spaced apart by a distance at least equal to half the maximum width of said channel, said parts being located radially beneath the running surface at distances less than the distances of the other points of said contour; and at least one recessed incision having, in radial projection on the running surface of the tread when new, a traverse orientation identical or virtually identical to that of the recessed channel(s) projected on the sane surface and each incision having small width compared with the average width of each channel, each incision opening radially onto the running surface at the latest at the time of the opening of the recessed channel to form said new groove on said running surface and extending within the thickness of the tread over the entire depth of the opened channel(s).

7. A mold for molding a tire provided with a tread extending axially via sidewalls as far as bead zones, said mold having a closed position and an open position and comprising two shells provided with molding surfaces each for molding a tire sidewall and a structure forming a ring concentric to the two shells for molding the tread of the tire, said ring and the shells, in the closed position of the mold, being in contact via their lateral ends, said mold being characterized in that:

at least one shell is formed of at least two annular shell parts concentric to each other, such that the molding surfaces of said parts, in the closed position of the mold, mold an entire sidewall, at least one of the shell parts is provided with at least a plurality of elements in relief projecting onto the molding surface of said shell part, said elements in relief of the same shell part having a point of anchoring and an end axially outermost of anchoring and having virtually the same geometry and the same orientation defined as being the direction between the point of anchoring of an element on the shell part and the end of said axially outermost element of said shell part, each of the shell parts bearing elements in relief is mobile in the circumferential direction relative to the other parts of the same shell, so as to permit the rotation of each of said parts relative to the other parts of the same shell at least under the action of the forces exerted by the tread on the elements in relief during demolding with the aim of facilitating demolding of the tire.

8. A mold according to claim 7, characterized in that there are furthermore provided additional means for rotating each mobile shell part bearing elements in relief during the opening of the mold.

9. A mold according to claim 7, characterized in that there are provided elastic return means between the shell parts of the same shell to ensure good positioning of said parts relative to each other before each molding operation.

10. A mold according to claim 7, characterized in that, in the closed position of the mold, the elements in relief borne by at least one shell boar on elements in relief borne by the structure forming the ring concentric to the two shells and molding the tread of the tire so as to resist bending stresses imposed by introduction of elastomeric material during a molding operation.

11. A mold according to claim 7, characterized in that the elements in relief borne by at least one shell are made of a metal alloy having a remanence characteristic appropriate for finding and maintaining a predetermined initial form, independently of the number of moldings effected.

12. A mold according to claim 7, characterized in that the elements in relief borne by at least one shell are each made of at least two fingers extending substantially parallel to each other, at least one of said fingers having a cross-section of an average width greater than the average width of the other fingers, and in that at least one of the other fingers is in the form of a thin strip in a profile formed by a succession of broken lines or of undulations.

13. A mold according to claim 7, characterized in that the shell part provided with a plurality of elements in relief comprises connection means between each of said elements in relief and said shell part which permit at least one of said elements in relief to be fastened and replaced easily.

* * * * *

UNITED STATES PATENT AND TRADEMARK OFFICE
CERTIFICATE OF CORRECTION

PATENT NO. : 6,408,910 B1
DATED : June 5, 2002
INVENTOR(S) : Lagnier et al.

It is certified that error appears in the above-identified patent and that said Letters Patent is hereby corrected as shown below:

Title page,
Item [56], References Cited, OTHER PUBLICATIONS, under JP03153406, "Abstacts" should read -- Abstracts --
Item [73], Assignee, "Generale" should read -- Générale --; and "Establishments" should read -- Etablissements --
Item [75], Inventor, "La Vialle" should read -- Lavialle --

Column 2,
Line 32, "1,5" should read -- 1.5 --

Column 8,
Line 37, "on to" should read -- onto --

Column 9,
Line 48, "Between,H3" should read -- Between H3 --

Column 12,
Line 4, "5 mm" should read -- 5 mm --

Column 14,
Line 8, "ring" should read -- running --
Line 13, "wear:" should read -- wear; --
Line 29, "rally" should read -- radially --
Line 42, "groves" should read -- grooves --

Column 15,
Line 40, "sane" should read -- same --

UNITED STATES PATENT AND TRADEMARK OFFICE
CERTIFICATE OF CORRECTION

PATENT NO.     : 6,408,910 B1
DATED          : June 5, 2002
INVENTOR(S)    : Lagnier et al.

It is certified that error appears in the above-identified patent and that said Letters Patent is hereby corrected as shown below:

Column 16,
Line 32, "boar" should read -- bear --

Signed and Sealed this

Eleventh Day of February, 2003

JAMES E. ROGAN
*Director of the United States Patent and Trademark Office*